Feb. 22, 1938. H. A. FISHER 2,108,811
GLASS SHEET, METHOD AND APPARATUS FOR MAKING SAME
Filed Aug. 24, 1935 4 Sheets-Sheet 4

Inventor
Henry A. Fisher

Patented Feb. 22, 1938

2,108,811

UNITED STATES PATENT OFFICE 2,108,811

GLASS SHEET, METHOD AND APPARATUS FOR MAKING SAME

Henry A. Fisher, Parkersburg, W. Va.

Application August 24, 1935, Serial No. 37,768

33 Claims. (Cl. 49—33)

The principal object of the invention is to produce sheet or plate glass of distinctive and pleasing appearance.

A further object of the invention is to produce sheet glass of a base appearance, having incorporated therein during manufacture glass of different appearance.

Another object of the invention is to provide a method and apparatus for producing sheet glass of distinctive and pleasing appearance, which method and apparatus permits of controlling the manufacture of the product in order to produce a multitude of beautiful designs.

A further object of the invention is to provide a method and devices used in practicing the method which will permit the manufacture of distinctive decorative glass with conventional sheet glass manufacturing apparatus.

A further object of the invention is to provide for manufacturing sheet glass of veined, mottled or variegated appearance, which will be sturdy in construction and which will have a flat surface.

Other objects of the invention, and other advantages of the method, apparatus and product will appear as the specification progresses.

In the drawings, which are illustrative of several preferred forms of the apparatus which I have devised to practice the method and produce the product.

While I have disclosed the apparatus of the invention used in association with a sheet forming machine of the table and roller type, it is to be distinctly understood that the apparatus of the invention may be used, and the method practiced in association with other types of sheet forming machines.

Figure 1:
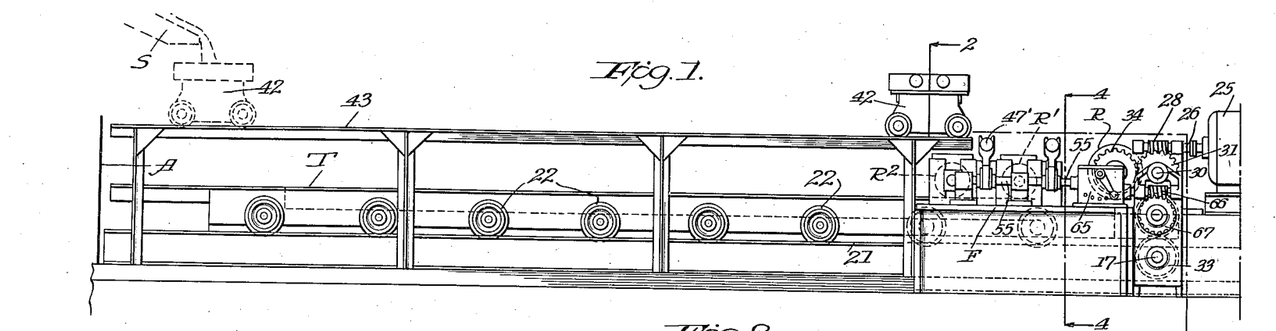
Figure 1 is a side elevational view of one form of the apparatus, showing a sheet glass producing apparatus equipped with the novel devices which form the combination to produce the product of this invention.

In producing the sheet or plate glass of the present invention, a quantity of molten glass is teemed upon the casting table T at the left hand end thereof, and the casting table is transferred from right to left in a manner hereinafter described, in order to roll the molten glass into sheet form, the rolling being accomplished by the casting roller R and with the assistance of the trailer rollers $R^1$ and $R^2$, which are properly positioned on the frame F above the casting table. The sheet thus formed may then be annealed and otherwise finished in the usual manner. Figure 1 shows the apparatus in position after the movement of the casting table T from right to left, the glass being rolled into sheet form along the upper surface of the table.

Figure 4:
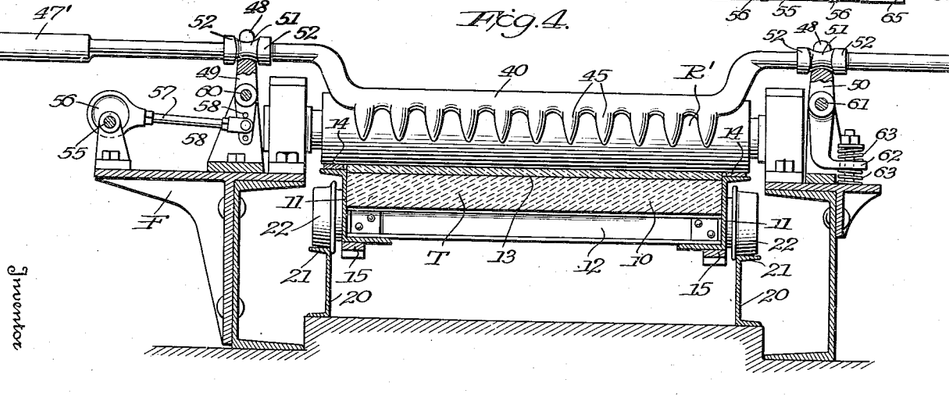
Figure 4 is a transverse vertical sectional view of the apparatus taken along the line 4—4 of Figure 1.

Referring to Figure 4, the casting table T comprises a body 10 held in place by longitudinal Z-shaped beams 11 and transverse I beams 12. The upper surface 13 of the table is recessed a short distance below the upper horizontal surface of the Z-beams 11, and a pair of spacing bars 14 are mounted longitudinally of the table upon the upper horizontal surface of the Z-beams, said bars serving to support the ends of the casting and trailer rollers to regulate the thickness of the glass sheet being rolled.

Figure 2:
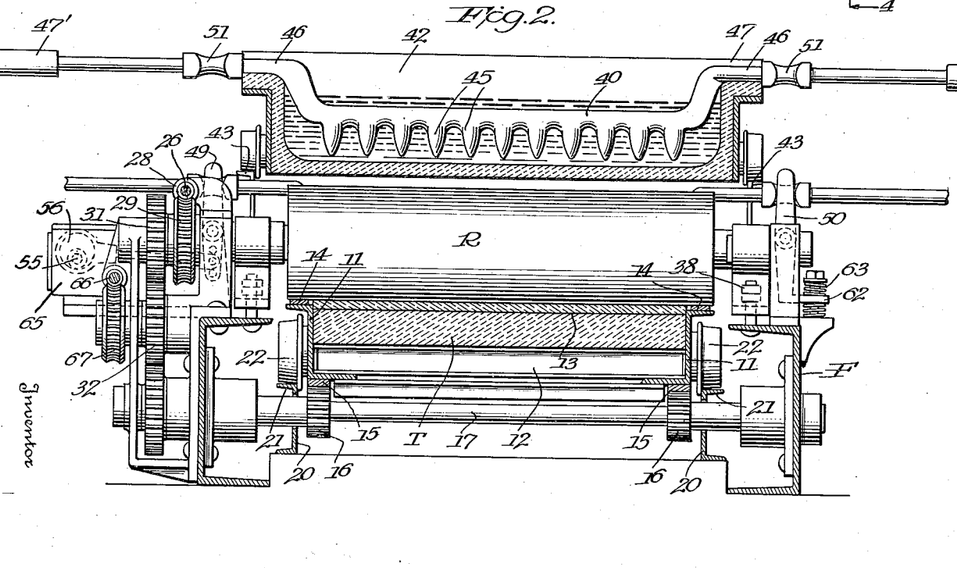
Figure 2 is a transverse vertical sectional view of the apparatus taken along the line 2—2 of Figure 1.
Figure 5:
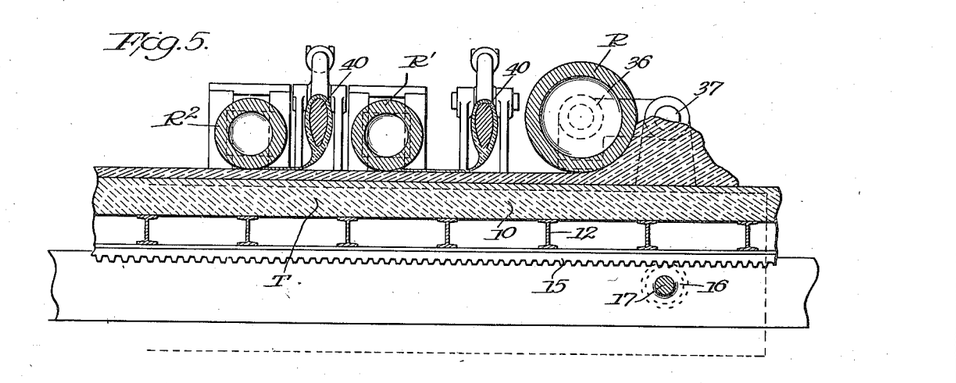
Figure 5 is an enlarged longitudinal vertical sectional view of a portion of the apparatus, showing the casting and trailer rollers in association with the table and decorative glass sources, the rollers being in the process of rolling a sheet of glass.

As shown in Figures 2, 4 and 5, the undersurface of the Z-beams 11 have attached thereto, on each side of the table, racks 15, which mesh with drive gears 16 secured on opposite ends of the casting table drive shaft 17.

As is best illustrated in Figures 2 and 4, the foundation of the machine has secured thereto, and running longitudinally of the apparatus, channel beams 20, whose upper surfaces 21 constitute a longitudinal trackway for the casting table, said table being provided with wheels 22 which are adapted to run along the trackway when the casting table is transferred.

As shown in Figure 1, the source of driving power for the apparatus is an electric motor 25, but obviously other suitable power means could be employed. This motor is mounted upon the frame of the apparatus in any convenient manner and drives a short shaft 26, shaft 26 having mounted thereon a worm 28 which drives a gear wheel 29 carried by a short transfer shaft 30.

Mounted on the shaft 30 is another gear 31 which drives an idler gear 32 which, in turn, drives a gear 33 carried by the casting table drive shaft 17.

Through the gear train discussed above, it will be apparent that after a quantity of the base glass is teemed upon the left hand end of the casting table, said table will be moved from right to left, as viewed in Figure 1, by the electric motor, and the glass will be flattened out on the table in sheet form by the casting roller with the assistance of the trailer rollers, after which the rolled sheet may be conveyed into the leer A for annealing. Obviously, the movement of the casting table, and the rotation of the various gears may be controlled by varying the speed of the electric motor, with consequent control of the decorative glass sheets being produced.

Figure 3:
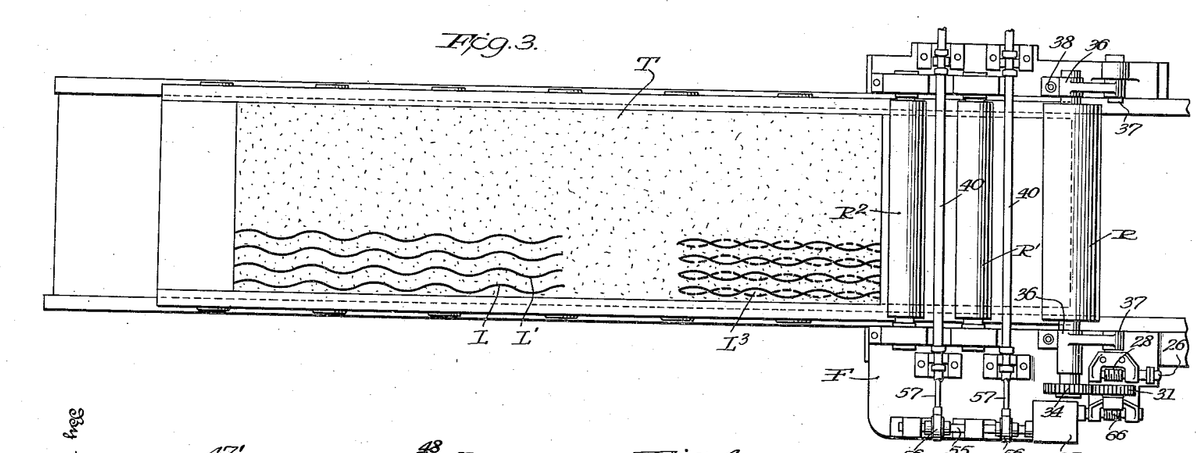
Figure 3 is a top plan view of a part of the apparatus shown in Figure 1, showing a glass sheet which has been formed by practicing the invention.

Referring to Figure 3, it will be noted that the shaft of the casting roller R extends out beyond the edge of the table and is provided with a casting roller drive gear 34 which is driven by the gear 31.

The gear trains to the casting roller drive shaft and to the casting table rack may be of such relative value that the casting roller will be rotated at a peripheral speed slightly less than the surface speed of the casting table, in order to prevent distorted effects in the surface of the glass.

The ends of the casting roller shaft are journaled in brackets 36 which are pivoted to the frame of the apparatus at 37, to permit some vertical movement of the casting roller as it flattens the glass out on the table.

As shown in Figures 2 and 5, this vertical movement is limited by the head of a bolt 38 secured to the machine frame and passing through a slot in the bracket 36.

It is to be understood that the glass sheets of this invention may be made thick as desired for structural purposes, such as table tops, bars, and wall material, or as thin as is needed, for mirrors and the like.

The trailer rollers $R^1$ and $R^2$ are shown mounted in suitable bearings at each side of the table, and these rollers may be mounted to be idly driven by the passage of the table beneath the same. The trailer rollers are also mounted for limited vertical movement while rolling over the sheet of glass, and it is obvious that, if desired, they may be geared to the machine drive in order to positively rotate them in a manner similar to the drive disclosed for the casting roller R.

The apparatus disclosed above will roll a sheet of glass of a base color and, as hereinafter described, the invention provides for striating, veining, mottling, or in any manner variegating the base sheet of glass thus rolled with decorative glass of different appearance, color or composition. By "base" sheet, I mean the sheet which is to form the foundation for the effects to be produced by the decorative glass of different appearance. The base sheet may be black or white, opaque, transparent, translucent, of any color or appearance to combine with the decorative glass to produce the desired appearance. The base sheet may of a single color, or of different colored glass teemed together upon the casting table, or mixed together in the tank furnace.

In order to produce the decorative glass of this invention, a decorative glass source 40, as shown in Figures 4 and 5, is mounted between the successive rollers. Ordinarily, and when producing only simple decorative effects, only one glass source 40 will be necessary, and preferably this single decorative glass source will be positioned between the casting roller R and the first trailer roller $R^1$. However, like results may be achieved by mounting the single decorative glass source between the two trailer rollers $R^1$ and $R^2$. Furthermore, if more complex designs are desired in the surface of the product of this invention, two decorative glass sources may be utilized, as shown in Figure 5, one being positioned between the casting roller and the first trailer roller and the other between the trailer rollers. When producing the more complex designs using a plurality of decorative glass sources, the decorative glass may be of the same color, composition or appearance, or each of the decorative glass sources may be provided with decorative glass of different appearance, composition or color, it being one of the principal purposes of the invention to control the appearance of the product. It will be obvious that the decorative glass may be of any suitable color, composition or appearance, black or white, transparent, translucent, opaque or variegated, to combine with the sheet of base glass to produce the ornamental effect desired.

The decorative glass may be brought to position for application to the sheet of base glass by a small receptacle 42 mounted on the trackway 43 which extends longitudinally of the apparatus. As shown in Figure 1, the small receptacle or auxiliary glass source 42 may be filled from the spout S from a glass furnace, as shown in dotted lines, and conveyed along the trackway 43 into working position adjacent the rolling mechanism.

A section of the small receptacle 42 is shown in Figure 2 in position adjacent the rolling mechanism, said receptacle being filled with a quantity of the decorative glass to be applied to the decorative glass source 40. The trough may be of metal or any suitable refractory material, and its temperature may be controlled by gas, oil, or air, as desired. The glass source 40 is shown in Figures 2 and 4 in the form of a gathering bar provided along its lower surface with a plurality of teeth or projections 45, said bar being bent to substantially crank shape where the teeth 45 are carried. This bar may be made of metal, refractory, or any other appropriate material. The gathering bar is placed in the receptacle 42 in the manner shown in Figure 2, with portions 46 of the bar resting in slots 47 in the ends of the receptacle, so that the crank portion of the bar, with the teeth 45, is immersed beneath the surface of the glass in the receptacle, in order to gather a quantity of the molten decorative glass to be applied to the base glass. The ends of the bar extend a considerable distance outwardly beyond the ends of the receptacle as shown at 47' to provide handles by which the bar may be lifted from the receptacle 42 and mounted in bearings 48 provided by slots in the upper end of a pair of pivoted arms 49 and 50 carried by brackets secured to the frame on opposite sides of the casting table. The bearings 48 may be rounded, as shown in Figure 4, to receive the rounded portions 51 of the bar 40, the rounded portions of said bar being between collars 52 carried by the bar, to insure that the bar will remain in place after being positioned between the rollers.

From the above description, it will be evident that when producing the sheet glass of the present invention, the decorative glass source discussed above, such as the bar 40, will be dipped in the decorative molten glass in the receptacle 42 and will then be manually lifted and positioned in its bearings 48 with the teeth 45 extending down between the rollers R, R¹ or R¹, R². As the casting table T is transferred from right to left to roll a sheet of glass thereon, substantially columnar shaped streams of decorative glass will fall, either continuously or intermittently, from the teeth 45 onto the surface of the base glass and these streams of decorative glass will form veins of different appearance in the surface of the rolled sheet, said veins extending lengthwise of the sheet by reason of the fact that the rolled sheet is transferred longitudinally of the apparatus beneath the decorative glass source.

In operation, the base glass carried by the casting table, having just been rolled by the rollers, will still be in a workable condition, and the decorative glass in the small receptacle 42 will be kept at such temperature that the streams of glass which flow from the projections 45 will be in molten condition and of substantially the same consistency as the base glass. Thus, the streams or threads of decorative glass will merge into the surface of the base glass, and become an integral part thereof.

In order to insure that the surface of the sheet of glass of this invention will be flat and unblemished, the decorative glass source is positioned between the casting roller and the first trailer roller, or between the two trailer rollers, so that the trailer roller or rollers will assist in producing a finished sheet by pressing the decorative glass a substantial depth into the roller sheet of glass of base color or appearance. By rolling the decorative glass into the surface of the base sheet to a substantial depth, the product may be ground and finished without destroying the ornamental effect.

The receptacle 42 may be provided with a plurality of slots at the ends thereof to receive any number of gathering bars 40, it being evident that such an arrangement is useful in order that one bar may be in use while the other is positioned in the receptacle 42 to gather glass. Furthermore, when utilizing two of the bars between the successive rollers as shown in Figure 5, both of said bars may be simultaneously dipped into the receptacle 42 to gather a quantity of glass. Likewise, the receptacle 42 may be provided with several compartments, and decorative glass of different color, composition or appearance may be carried in each compartment, and this different appearing decorative glass may be gathered simultaneously by a pair of gathering bars 40, and one of said bars may be disposed between each of the successive rollers as shown in Figure 5, in order to impart, for example, a multi-colored design to the surface of the sheet of base glass.

If a decorative glass source such as the gathering bar 40, together with its teeth 45, is held in the same position during the veining operation substantially straight lines of decorative glass will be rolled into the surface of the base sheet. I have found that the beauty of the sheet glass of this invention is enhanced if the decorative glass source, such as the gathering bar 40, is oscillated transversely of the casting table as the sheet of glass is transferred. In order to provide for this oscillation, as best shown in Figure 4, a shaft 55 is mounted in suitable bearings on the frame F of the apparatus, said shaft having mounted thereon an eccentric 56 which reciprocates a connecting rod 57 which is pivoted at any one of a plurality of points 58 to the oscillating arm 49. The oscillating arm is pivoted at 60 to a bracket carried by the frame, said pivot being between the pivot points 58 and the bearings 48 which carry the gathering bar. It will be observed that the arm 50 on the opposite side of the table is pivoted to a bracket on the frame at 61, and the end of said arm opposite to the end which carries the bearings 48 is provided with a bent extension 62 held between compression springs 63.

By reason of this construction, when the oscillation drive shaft 55 is rotated, the connecting rod 57 will be reciprocated by the eccentric 56, and being pivoted to the arm 49, the latter will be oscillated around the pivot 60, thus imparting to the decorative glass source, such as the gathering bar 40, a transverse oscillating movement across the casting table. The springs 63 which engage opposite faces of the extension 62 of the pivoted arm 50 serve to cushion the oscillations of the decorative glass source, thus making the oscillations smooth and regular. The oscillation of the glass source, together with the transfer movement of the casting table beneath the glass source will produce wavy lines or veins in the surface of the base glass, as shown by the lines L in Figure 3.

According to Figures 1, 2 and 3, the oscillation drive shaft 55 is driven through a transmission 65, including change speed gears, from a worm 66 which is in turn driven by a gear 67 fixed for rotation with the idler gear 32. Thus, the oscillation drive shaft, by the above gear train, is driven from the main drive of the apparatus.

It is to be particularly noted that, by reason of the change speed transmission gearing 65, the speed of rotation of the oscillation drive shaft 55 may be varied irrespective of the speed of the main drive shaft, the casting table, and the casting roller, so that the transverse oscillations of the decorative glass source may be varied by this change of speed to control the design of the product. For instance, if the speed of the oscillation drive shaft 55 is increased, the decorative glass curves imparted to the surface of the base glass sheet will pass through a complete cycle in a decreased linear distance along the length of the glass sheet. On the other hand, if the speed of rotation of the oscillation drive shaft is decreased, with respect to the transfer speed of the casting table, the decorative curves imparted to the surface of the sheet of base glass will be flatter in appearance, i. e., it will take a longer linear dimension of the glass sheet for the decorative curves to pass through a complete cycle.

It will be further noted that a plurality of apertures 58 are provided in the lower end of the pivoted arm 49, upon the opposite side of the pivot 60 from the bearing slots 48. By pivot pinning the end of the crank 57 to the arm 49 at the different points 58, i. e., at varying distances from the pivot 60, the amplitude of oscillation of the glass source transversely of the casting table can be varied. For instance, if the connecting rod 57 is pivoted to the arm 49 adjacent to the pivot point 60, the oscillations of the decorative glass source will be relatively great in amplitude, while if the connecting rod 57 is pivoted to the arm 49 at the lower end of said arm, and away from the pivot 60, the oscillations of the decorative glass source will be relatively small in amplitude.

Thus, it will be seen that I have provided for control of the amplitude of the decorative lines imparted to the base sheet transverse to the same, as well as controlling the frequency of the curves imparted to the sheet, said frequency being measured in terms of lineal units of length of the base sheet.

When using a plurality of decorative glass sources, such as the two gathering bars 40 shown in Figure 5, both of said decorative glass sources may be oscillated from the common oscillation drive shaft 55 as shown in Figures 1 and 2. By adjusting the various control devices, the teeth 45 can be made to impart adjacent similar lines of different color or appearance as shown by the decorative lines L and L¹ on the glass sheet (Figure 3). That is, one of the bars 40 may be dipped in red glass and the other bar 40 dipped in black glass, and the teeth of said bars can be adjusted to impart the similar parallel curved lines L and L¹ shown in Figure 3. When using a pair of decorative glass sources as discussed above, the respective eccentrics 56 on the oscillation drive shaft 55 may be adjusted around said shaft in order to vary the relative throws of said cams to impart lines L³ (Figure 3) to the glass sheet, which lines can be made to cross one another in regular or irregular fashion as desired, and these crossing lines may be of the same or different color or appearance.

While I have shown an automatic arrangement for imparting decorative effects to the base glass, and automatic means for controlling these effects, the product may be controlled by hand by uncoupling the connecting rod 57 so that an attendant may oscillate the decorative glass source by hand as desired. In this manner, various artistic effects may be produced, depending on the skill of the attendant.

Figure 6:
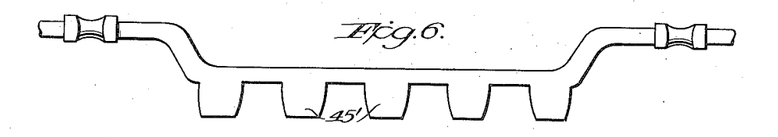
Figures 6 and 7 are side elevations of modified forms of the decorative glass source.

Figure 6 shows a modified form of the gathering bar 40 of Figure 4, wherein the bar is equipped with a plurality of spaced blunt teeth 45'. In using this modified form of gathering bar, the glass may flow continuously from the lower surfaces of the teeth 45' to produce relatively wide lines on the base glass, whereas the openings between the teeth 45' will not gather any decorative glass when the bar is dipped into the receptacle 42.

Figure 7:
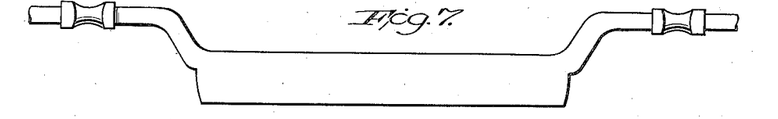

In Figure 7, a further modification of gathering bar is shown, comprising a crank shaped bar having a continuous lower edge. The use of this bar results in a product which has a considerable portion of the surface of the base glass covered by the decorative glass. However, due to the uneven manner in which the decorative glass will flow from the lower edge of this bar, there will be spaces of the base sheet of glass which will not be covered by the decorative glass.

Figure 8:
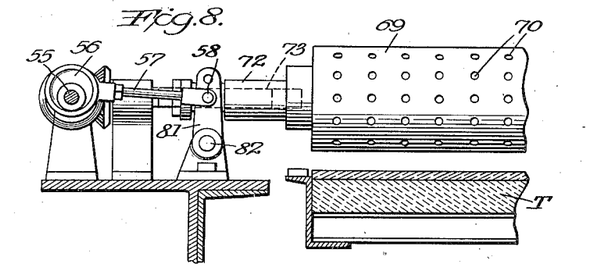
Figure 8 is a vertical transverse sectional view of a portion of the casting table, having associated therewith a modified form of decorative glass source with mechanism for controlling the same.
Figure 9:
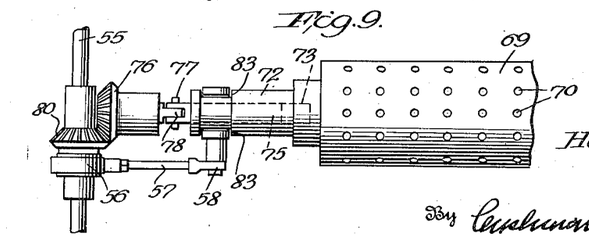
Figure 9 is a top plan view of the modified form of the apparatus shown in Figure 8.

In Figures 8 and 9, a modified form of decorative glass source is shown, said source comprising instead of the toothed gathering bar 40 of Figure 4, a metal cylinder or drum 69 having a plurality of apertures 70 therein, which drum may be dipped into the receptacle 42 in a manner similar to that shown in Figure 2 for the bar 40. The cylinder may be of foraminous metal or of screen-like material as desired, and the apertures 70 may be placed therein in regular or irregular fashion as desired to control the design which is to be imparted to the base sheet of glass. The end of the cylinder which is to be driven from the oscillation drive shaft 55 is secured to a stub shaft 72 provided with a bore 73 square in cross section which is adapted to receive the inner end of the rod 75 which is also square in cross section. It will be noted that the inner end of the bar 75 does not extend to the inner end of the bore 73. The bar 75 is connected with a gear 76 by its inner bifurcated end 77 which slips over the extension 78 from the gear 76. The gear 76 is driven by a gear 80 fixed to the oscillation drive shaft 55.

In this modification, the oscillation drive shaft is also provided with the eccentric 56 which oscillates the connecting rod 57, and said connecting rod is pivoted at 58 to an arm 81 which in turn is pivoted to the machine frame at 82. The arm 81 is bifurcated at its upper end and provides a bearing for the stub shaft 72 which carries the decorative glass source, said stub shaft being provided with slots 83 in which the bifurcations of the rod 81 fit. The opposite end of the drum may be supported in a similar manner.

With the above construction, and when the oscillation drive shaft is driven, the resulting rotation of the gear 76, the squared bar 75 and the stub shaft 72 will rotate the decorative glass source, such as the drum 69, at a speed depending on the adjustment of the change speed devices in the transmission 65 and the speed of the driving motor 25. Also, by reason of the eccentric 56, connecting rod 57, oscillating arm 81 and bearing slots 83, the decorative glass source will be oscillated transversely of the casting table, it being apparent that the stub shaft 72 may move back and forth with respect to the bar 75. Thus, I have provided for control of the decorative design imparted to the base glass by rotating the decorative glass source above the same, and controlling the speed of rotation, and also by oscillating said decorative glass source transversely of the casting table, and controlling the speed of said oscillations. Obviously, the control mechanism described in connection with this modification of the decorative glass source could be used in association with any of the other decorative glass sources. Furthermore, it is evident that by changing the pivot point 58 as discussed in connection with the embodiment of Figure 4, the amplitude of the oscillations of the decorative glass source may be varied.

In practice, when operating the embodiment shown in Figures 8 and 9, the gear train from the electric motor 25 to the gear 76 will be of such value that the drum 69 will be rotated at a very slow speed. In connection with this embodiment, the glass may be permitted to fall through the apertures 70 in intermittent drops or may fall therefrom in a steady columnar stream or thread. If the glass flows from the apertures 70 in drops, a mottled decorative effect will be produced on the base glass sheet. It is of course within the scope of the invention to employ a plurality of the drums 69 between the rollers as disclosed in connection with the embodiment of Figure 5. Furthermore, as in the other embodiments of the invention, the automatic mechanism for moving the decorative glass source may be disconnected to permit hand control of the product.

Figure 10:
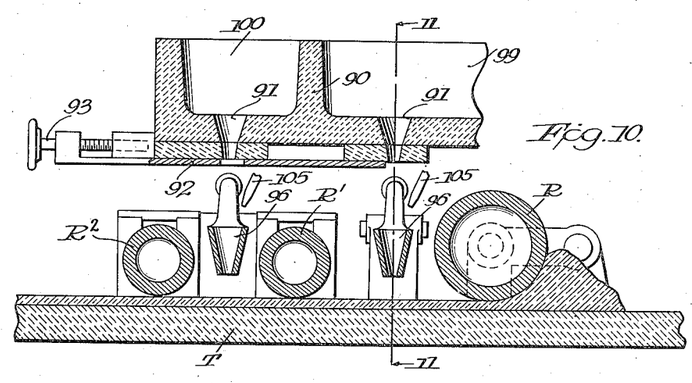
Figure 10 is a view similar to Figure 5 of a modified form of the invention, wherein a decorative glass tank is mounted over the casting table.

In Figure 10, devices are shown for practicing the method of this invention which may be conveniently associated with continuous sheet glass forming machines. In this embodiment of the invention, the molten decorative glass is shown carried by a glass tank furnace 90 provided with suitable outlets 91, the degree of opening of which outlets may be controlled by the apertured bar 92 which may be adjusted by means of the screw 93. The outlets 91 from the tank 90 may be positioned between the casting roller R and the first trailer roller R¹, or between the trailer rollers, or a row of outlets may be provided between each of the adjacent rollers as shown. As the molten decorative glass flows from the outlets 91 onto the base glass on the casting table, the design imparted to the base glass may be controlled by means of a bar 95 of the type shown in Figure 11. This bar is provided with a crank shaped portion similar to the bar 40 shown in Figure 4, and is provided with a plurality of funnel-shaped passages 96 which extend through the bar and are adapted to control the flow of the decorative glass streams onto the base glass.

The bar 95 is mounted for oscillation in a manner identical with that shown with respect to the bar 40 in Figure 4, and the upper ends of the funnel-shaped passages 96 are of sufficient diameter to receive the streams of decorative glass from the outlets 91 throughout the complete oscillation of the bar. The passages 96 control the flow of the molten decorative glass stream and permit said streams to fall onto the base glass in the desired manner, controlled by the speed and amplitude of oscillation of the bar. In this manner, decorative glass may be continuously applied to the surface of the base glass.

As in the other embodiments, the bar 95 may be oscillated by hand to control the design imparted to the surface of the base glass as desired.

Figure 13:
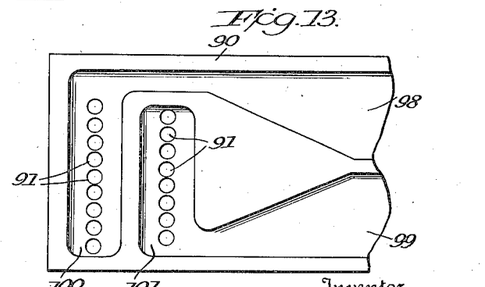
Figure 13 is a view of the interior of the decorative glass tank used in conjunction with the apparatus of Figures 10 and 11.

As shown in Figures 10 and 13, the tank furnace 90 may be divided into a plurality of compartments 98 and 99, and, if desired, molten decorative glass of different color, composition or appearance may be disposed in each of said compartments. In order to utilize a plurality of rows of outlets 91 from the separate tank compartments, each compartment may merge into L-shaped ends 100 and 101, end 100 being open to the flow of molten decorative glass from compartment 98, while end 101 is open to the flow of molten decorative glass from compartment 99. As shown in Figure 13, the L-shaped end 101 is disposed within the end 100.

In positioning a tank 90 of the type shown in Figure 13 above the base glass, the row of outlets 91 in the tank end 101 is positioned above and between the casting roller and the first trailer roller, and the tank end 100 is positioned between and above the trailer rollers.

Figure 12:
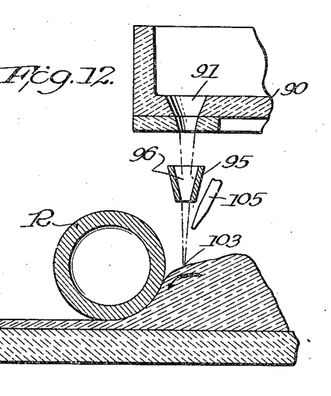
Figure 12 is a modified arrangement of the apparatus shown in Figures 10 and 11.

In Figure 12, a tank 90 with its outlets 91 is shown positioned above the quantity of glass teemed upon the casting table before said glass has been acted upon by the casting roller R. It will be noted in this embodiment that the stream of molten decorative glass falls upon the surface of the quantity of base glass just before the base glass is drawn beneath the casting roller to be changed into sheet form. That is to say, the molten streams of decorative glass are flowed upon the surface of the molten base glass just prior to the time when the base glass is operated upon to be formed into a sheet, and by this arrangement, a sheet of glass will be formed having decorative lines or mottled portions therein in which the decorative glass will not be too intimately mixed with the base glass. In connection with this embodiment, it will be understood that if the decorative glass is joined with the base glass a considerable time before the base glass is formed into a sheet, the glass of different appearance will too intimately merge, thus resulting in a less attractive product. In this embodiment, when the casting table is moving from right to left and the base glass is being carried beneath the casting roller, the base glass at the point 103 where the streams of decorative glass join the same will be moving toward the sheet forming device, i. e., the casting roller R, and thus the decorative glass will be carried beneath the casting roller in the form of lines, which will appear on the surface of the formed sheet.

Figure 11:
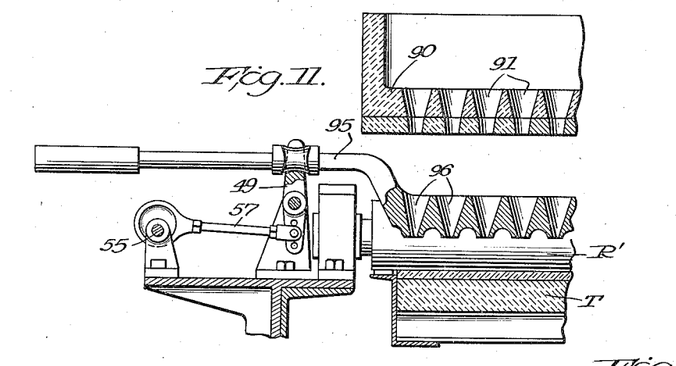
Figure 11 is a transverse vertical sectional view taken along the line 11—11 of Figure 10.

In operating with the construction of this modification of the invention, a controlling bar 95 with the passages 96, as shown in Figure 11, may be used, and this bar may be oscillated to control the decorative effect imparted to the base glass in the manner shown in Figure 11.

It will be understood that any of the other decorative glass sources disclosed heretofore in this application may be mounted before the casting roller R, as shown in Figure 12, if desired, although the preferred method is to apply the molten streams of decorative glass to the base glass after the base glass has been formed into a sheet.

In Figures 10 and 12, downwardly directed nozzles 105 are shown positioned adjacent to the path of flow of the molten decorative streams from the tank 90 to the quantity of base glass. If it is desired to project the molten decorative glass in fine form onto the surface of the base glass, the streams of decorative glass may be acted upon by air or steam or the like blown through the jets 105.

In Figure 12, the finely divided molten decorative glass will be projected onto the molten quantity of base glass immediately prior to the forming of the base glass into sheet form, while in Figure 10, the molten decorative glass will be projected in finely divided form onto the base glass after the latter has been operated upon by the casting roller or by the casting and trailer roller which shapes the base glass into sheet form.

If it is desired to project the molten decorative glass onto the surface of the base glass in very finely divided condition, such as "glass wool", the tank 90 and the jets 105 may be elevated to a considerably greater distance above the quantity of base glass, and the pressure of the steam or air which comes from the nozzles 105 may be regulated to project the molten decorative glass in the form of "glass wool" onto the surface of the base glass.

Figure 14:
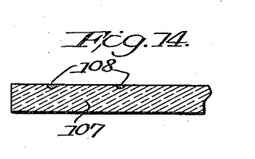
Figure 14 is a transverse vertical sectional view of the sheet of glass shown in Figure 3.

Figure 14 is an enlarged view of a sheet of glass produced in accordance with the present invention. It will be noted, in this figure, that the sheet of glass of base appearance or composition 107 has in its surface lines of decorative glass 108, the manner in which said lines decorate the surface of the sheet being more clearly shown in Figure 3. In Figure 14, the lines of decorative glass 108 are shown formed in the surface of the base sheet 107, and it will be noted that the face of the sheet is flat and free from distortion, by reason of the fact that the decorative glass is worked into the base sheet of glass. It will be further observed that the decorative glass extends into the base sheet to a considerable depth, so that the product may be finished by grinding and polishing without removing the decorative effect.

While I have shown in Figure 3 a glass sheet which is provided with wavy lines of the decorative glass, it is obvious that with the apparatus herein disclosed and from the method described, straight lines or veining of almost any characteristics can be produced in the sheet of base glass. That is to say, by reason of the control features which have been incorporated in this invention, the variations in the appearance of the glass which can be produced are innumerable, all of them having in common the quantity of decorative glass which is worked while in a plastic condition into the surface of the molten base sheet of glass. As has been discussed above, the decorative effects need not be in the form of narrow lines, but may be in the form of worked in spots, as can be produced by the apparatus of Figures 8 and 10, or the effect can be in the nature of broad lines as would result from the use of the device of Figure 6, or a substantial area of the sheet of rolled base glass may be covered by using the decorative glass source shown in Figure 7.

The base glass may be opaque, and opaque decorative glass of different appearance may be incorporated therein in the manner disclosed herein to produce structural plates or sheets. In addition, I have found that sheets of glass of pronounced beauty may be made by practicing the method of this invention, and with the apparatus disclosed herein, by using transparent base glass and translucent, or opaque decorative glass formed in the base glass in vein-like manner, as desired. The transparent base sheet may be silvered on its back surface to form a mirror, in which case the veins of decorative glass may be of delicate tint and narrow if the veins are light, or the veins may also be transparent, all resulting in effects of pronounced beauty. Furthermore, the base glass may be colored, and translucent and silvered on its rear surface to form a mirror, or it may be mirror-like in appearance when mounted to cover an opaque wall.

It is to be understood that departures may be made from the apparatus and method disclosed herein without leaving the range of the invention.

I claim:—

1. The method of manufacturing decorative glass sheets which comprises forming a base sheet of molten glass, moving said sheet with respect to a source of molten decorative glass of different appearance, and flowing a stream of said decorative glass onto said moving sheet while oscillating said stream transversely with respect to said sheet and while said sheet is in workable condition.

2. In an apparatus of the class described, supply means for molten decorative glass, means for moving a quantity of molten glass of base appearance beneath said supply means, means for flowing a molten stream of said decorative glass onto said base glass, and means for oscillating said flowing means transversely with respect to the direction of movement of said base glass during the flowing operation.

3. In an apparatus of the class described, means for holding a quantity of molten base glass, supply means for molten decorative glass, means for forming said base glass into sheets, means for flowing streams of said decorative glass from said supply means onto said base glass, means for oscillating said flowing means during said flowing operation, and means for varying the amplitude of the oscillations of said flowing means.

4. In an apparatus of the class described, means for holding a quantity of molten base glass, supply means for molten decorative glass, means for forming said base glass into sheets, means for flowing streams of said decorative glass from said supply means onto said base glass, means for oscillating said flowing means during said flowing operation, and means for varying the speed of the oscillations of said flowing means.

5. In an apparatus of the class described, means for holding a quantity of molten base glass, supply means for molten decorative glass, means for forming said base glass into sheets, means for flowing streams of said decorative glass from said supply means onto said base glass, means for rotating said supply means during said flowing operation, and means for varying the speed of rotation of said supply means.

6. The method of manufacturing variegated glass sheets, which comprises providing a body of molten glass of base appearance and a source of molten glass of different appearance, relatively moving said base glass with respect to said source, flowing a stream of said molten glass of different appearance onto said base glass during said movement, oscillating said stream transversely of the direction of relative movement of said base glass while flowing said decorative glass, and finishing said glass into sheet form.

7. The method of manufacturing variegated glass sheets, which comprises providing a body of molten glass of base appearance and a source of molten glass of different appearance, relatively moving said base glass with respect to said source, flowing a stream of said molten glass of different appearance onto said base glass during said movement, oscillating said stream transversely of the direction of relative movement of said base glass while flowing said decorative glass and during the formation of said glass into sheet form.

8. The method of manufacturing variegated glass sheets, which comprises providing a body of molten glass of base appearance and a source of molten glass of different appearance, relatively moving said base glass with respect to said source, forming said base glass into sheet form, flowing a stream of said molten glass of different appearance onto said base glass during said movement and immediately prior to said sheet forming operation, oscillating said stream transversely of the direction of relative movement of said base glass while flowing said decorative glass, and finishing said glass into sheet form.

9. The method of manufacturing variegated glass sheets, which comprises providing a body of molten glass of base appearance, and a source of molten decorative glass, forming a freely falling stream of said molten decorative glass, subjecting the decorative glass in said freely falling stream to a pressure blast to forcibly project the same in the form of minute particles onto said body of base glass and embedding said finely divided decorative glass particles in said base glass while the latter is in workable condition, with surfaces of said particles exposed at the surface of said body of base glass, and finishing said glass into a smooth surfaced sheet with a plurality of minute decorative areas in the plane of the base glass.

10. The method of manufacturing variegated glass sheets, which comprises providing a body of molten glass of base appearance, and a source of molten decorative glass, forming a freely falling stream of said molten decorative glass, subjecting the decorative glass in said freely falling stream to a pressure blast to forcibly project the same in the form of minute particles onto said body of base glass while the latter is being formed into sheets, and embedding said finely divided decorative glass particles in said base glass while the latter is in workable condition, with surfaces of said particles exposed at the surface of said body of base glass, to form a plurality of minute decorative areas therein and with the exposed surfaces of said decorative areas in the plane of said base glass.

11. As an article of manufacture, a sheet of glass comprising a base layer having a ribbon of glass of different appearance embedded therein at points spaced inwardly from the edge of the sheet, with a surface of said different glass exposed and in the plane of the surface of the base glass, the transverse dimension of said ribbon being materially less than the width of the base layer of the sheet, the opposite surfaces of said sheet being smooth and flat.

12. As an article of manufacture, a sheet of glass comprising a base layer having a plurality of spaced ribbons of glass of different appearance embedded therein at points spaced inwardly from the edge of the sheet, with a surface of said different glass exposed and in the plane of only one surface of the base glass, the transverse dimension of said ribbons being materially less than the width of said base layer of the sheet, the opposite surfaces of said sheet being smooth and flat.

13. As an article of manufacture, a sheet of glass comprising a base layer having a wavy ribbon of glass of different appearance embedded therein at points spaced inwardly from the edge of the sheet, with the surface of said different glass exposed and in the plane of the surface of the base glass, the transverse dimension of said ribbon being materially less than the width of the base layer of the sheet, the opposite surfaces of said sheet being smooth and flat.

14. As an article of manufacture, a sheet of glass comprising a base layer having a plurality of spaced wavy ribbons of glass of different appearance embedded therein at points spaced inwardly from the edge of the sheet, with a surface of said different glass exposed and in the plane of only one surface of the base glass, the transverse dimension of said ribbons being materially less than the width of the base layer of the sheet, the opposite surfaces of the sheet being smooth and flat.

15. The method of manufacturing variegated glass sheets, which comprises providing a body of molten glass of base appearance, and a source of molten decorative glass, forming and flowing a molten stream of said decorative glass of relatively small transverse dimension with respect to the width of said body of base glass, onto the latter at a point spaced inwardly from the edge of said body of base glass and embedding said decorative glass in said base glass while said glass is in workable condition, with a surface of said decorative glass exposed at the surface of said base glass, providing relative movement between said base glass and said stream, and finishing said glass into a smooth surfaced sheet with a decorative area in said base glass of materially less width than the width of the sheet and with the exposed surface of the decorative area in the plane of the surface of the base glass.

16. The method of manufacturing variegated glass sheets, which comprises providing a body of molten glass of base appearance and a source of molten decorative glass, shaping said base glass into a smooth surfaced sheet, forming and flowing a molten stream of said decorative glass of relatively small transverse dimension with respect to said body of base glass, onto the latter at a point spaced inwardly from the edge of said body of base glass before the completion of said sheet shaping operation and embedding said decorative glass in said base glass while said glass is in workable condition, with a surface of said decorative glass exposed at the surface of said base glass, to form a decorative area in said base glass of materially less width than the width of the sheet and with the exposed surface of the decorative area in the plane of the surface of the base glass.

17. The method of manufacturing decorative glass sheets, which comprises providing a body of molten glass of base appearance, and a source of molten decorative glass, shaping said base glass into sheet form, forming and flowing a molten stream of said decorative glass of relatively small transverse dimension with respect to the width of the sheet onto the latter at a point spaced inwardly from the edge of the sheet, and pressing said decorative glass into the sheet while said glass is in workable condition with a surface of said decorative glass exposed at the surface of said base glass, to form a decorative area in said base glass of materially less width than the width of the sheet and with the exposed surface of the decorative area in the plane of the surface of the base glass.

18. The method of manufacturing variegated glass sheets, which comprises providing a body of molten glass of base appearance, moving said molten base glass to position where the same is formed into sheets, providing a source of molten decorative glass, forming and flowing during said movement a stream of said molten decorative glass of relatively small transverse dimension with respect to the width of said body of base glass, onto the latter at a point spaced inwardly from the edge of the same before the completion of said sheet forming operation and embedding said decorative glass in said base glass, while said glass in is workable condition, with a surface of said decorative glass exposed at the surface of said base glass, and finishing said glass into a smooth surfaced sheet with a decorative area in said base glass of materially less width than the width of the sheet and with the exposed surface of the decorative area in the plane of the base glass.

19. The method of manufacturing variegated glass sheets, which comprises providing a body of molten glass of base appearance, moving said molten base glass while forming the same into sheets, providing a source of molten decorative glass, forming and flowing a stream of said molten decorative glass of relatively small transverse dimension with respect to the width of said body of base glass, onto the latter at a point spaced inwardly from the edge of the same during said movement and embedding said decorative glass in said base glass while said glass is in workable condition, with a surface of said decorative glass exposed at the surface of said base glass, and finishing said glass into a smooth surfaced sheet with a decorative area in said base glass of materially less width than the width of the sheet and with the exposed surface of the decorative area in the plane of the surface of the base glass.

20. The method of manufacturing variegated glass sheets, which comprises providing a body of molten glass of base appearance, and a source of molten decorative glass, forming and flowing a plurality of spaced molten streams of said decorative glass of relatively small transverse dimension with respect to the width of said body of base glass, onto the latter at the points spaced inwardly from the edge of the same and embedding said decorative glass in said base glass while said glass is in workable condition, with surfaces of said decorative glass exposed at the surface of said base glass, providing relative movement between said base glass and said streams, and finishing said glass into a smooth surfaced sheet with a plurality of spaced decorative areas in said base glass of materially less width than the width of the sheet and with the exposed surfaces of the decorative areas in the plane of the surface of the base glass.

21. The method of manufacturing variegated glass sheets, which comprises providing a body of molten glass of base appearance, moving said molten base glass to position where the same is formed into sheets, providing a source of molten decorative glass, forming and flowing during said movement a plurality of spaced streams of said molten decorative glass of relatively small transverse dimension with respect to the width of said body of base glass, onto the latter at points spaced inwardly from the edge of the same before the completion of said sheet forming operation and embedding said decorative glass in said base glass while said glass is in workable condition, with surfaces of said decorative glass exposed at the surface of said base glass, and finishing said glass into a smooth surfaced sheet with a plurality of spaced decorative areas in said base glass of materially less width than the width of the sheet and with the exposed surfaces of the decorative areas in the plane of the surface of the base glass.

22. In an apparatus for forming glass sheets, supply means for a quantity of molten decorative glass, means for supporting a body of molten glass of base appearance, means for forming and flowing a stream of said molten decorative glass of relatively small transverse dimension with respect to the width of said body of base glass, said last named means being positioned inwardly from the edge of the body of base glass to flow said stream onto the base glass at a point spaced inwardly from the edge of the same while said glass is in workable condition, and means providing relative movement between said base glass and said flowing means.

23. In an apparatus of the class described, means for moving a body of molten glass of base appearance and for shaping said glass into sheet form during said movement, supply means for a quantity of molten glass of decorative appearance, and stationary means adjacent said shaping means for forming and flowing a stream of said molten decorative glass of relatively small transverse dimension with respect to the width of the sheet, said last named means being positioned inwardly from the edge of the body of base glass to flow said stream onto said base glass at a point spaced inwardly from the edge of said body of base glass during the movement of the latter, and while said glass is in workable condition.

24. In an apparatus for forming glass sheets, supply means for a quantity of molten decorative glass, means for supporting a body of molten glass of base appearance, means for forming and flowing a stream of said molten decorative glass of relatively small transverse dimension with respect to the width of said body of base glass, said last named means being positioned inwardly from the edge of the body of base glass to flow said stream onto the base glass at a point spaced inwardly from the edge of the same, and means for pressing said decorative glass into said base glass while said glass is in workable condition.

25. In an apparatus for forming glass sheets, supply means for a quantity of molten decorative glass, means for supporting a body of molten glass of base appearance, means for forming and flowing a plurality of spaced streams of said molten decorative glass of relatively small transverse dimension with respect to the width of said body of base glass, said last named means being positioned inwardly from the edge of the body of base glass to flow said spaced streams onto the base glass at points spaced inwardly from the edge of the same while said glass is in workable condition, and means providing relative movement between said base glass and said flowing means.

26. In an apparatus of the class described, means for supporting a body of molten glass of base appearance, means for shaping said molten base glass into sheets, and a tank for molten decorative glass positioned adjacent said sheet shaping means, said tank being provided with a plurality of spaced outlets to form and flow a plurality of spaced molten streams of said decorative glass of relatively small transverse dimension with respect to the width of said body of base glass, said outlets being positioned inwardly from the edge of the body of base glass to flow said spaced streams onto the base glass at points spaced inwardly from the edge of the same while said glass is in workable condition.

27. In an apparatus of the class described, means for moving a body of molten glass of base appearance and for shaping said glass into sheet form during said movement, supply means for a quantity of molten glass of decorative appearance, and stationary means adjacent said shaping means for forming and flowing a plurality of spaced streams of said molten decorative glass of relatively small transverse dimension with respect to the width of the sheet, said last named means being positioned inwardly from the edge of the body of base glass to flow said spaced streams onto said base glass at points spaced inwardly from the edge of the latter during movement of the same, and while said glass is in workable condition.

28. As an article of manufacture, a sheet of glass comprising a base layer having a plurality of spaced areas of glass of different appearance embedded therein at points spaced inwardly from the edge of the sheet, with the surfaces of said areas of different glass exposed and in the plane of the surface of said base glass, the widths of said areas of base glass being materially less than the width of the base layer of the sheet, the opposite surfaces of said sheet being smooth and flat.

29. In an apparatus of the class described, means for moving a body of molten glass of base appearance and for shaping said glass into sheet form during said movement, and means for forming and flowing a plurality of streams of molten decorative glass of relatively small transverse dimension with respect to the width of the body of base glass, said last named means including a tank for the molten decorative glass positioned above the body of base glass and adjacent said sheet shaping means and a plurality of flow channels for the decorative glass spaced from one another transversely of the direction of movement of the base glass, said flow channels being positioned relative to the base glass to flow the molten streams of decorative glass onto the base glass at points spaced inwardly from the edge of the latter.

30. In an apparatus of the class described, means for moving a body of molten glass of base appearance and for shaping said glass into sheet form during said movement, means for forming and flowing a stream of molten decorative glass of relatively small transverse dimension with respect to the width of the body of base glass, said last named means including a tank for the molten decorative glass positioned above the body of base glass and adjacent said sheet shaping means and a flow channel for the decorative glass, said flow channel being positioned relative to the base glass to flow the molten stream of decorative glass onto the base glass at a point spaced inwardly from the edge of the latter, and means for pressing the decorative glass into the base glass with an area of the decorative glass exposed in the plane of the surface of the base glass.

31. In an apparatus of the character described, means for moving a body of molten glass of base appearance and for shaping said glass into sheet form during said movement, and means for forming and flowing a stream of molten decorative glass of relatively small transverse dimension with respect to the width of the body of base glass, said last named means comprising a gathering bar for the molten decorative glass positioned above the body of base glass and adjacent said sheet shaping means and a projection on said bar positioned relative to the base glass to flow a molten stream of decorative glass onto the base glass at a point spaced inwardly from the edge of the latter.

32. In an apparatus of the character described, means for moving a body of molten glass of base appearance and for shaping said glass into sheet form during said movement, means adjacent said sheet shaping means for forming a freely falling stream of molten decorative glass, means for subjecting the freely falling stream of molten decorative glass to a pressure blast to forcibly project the same in the form of minute particles onto said body of base glass during the sheet shaping operation, and means for finishing the combined glass into a smooth surfaced sheet with a plurality of decorative areas embedded in the base glass.

33. In an apparatus of the class described, means for supporting a body of molten glass of base appearance, means for shaping said molten base glass into sheets, a tank for molten decorative glass positioned adjacent said sheet-shaping means, said tank being provided with an outlet to form and flow a molten stream of said decorative glass of relatively small transverse dimension with respect to the width of said body of base glass, and means interposed between the tank outlet and the base glass to control the flow of said decorative glass stream, said last named means being positioned inwardly from the edge of the body of base glass to flow said stream onto the base glass at a point spaced inwardly from the edge of the same while said glass is in workable condition.

HENRY A. FISHER.